US012522250B2

United States Patent
Kasuya et al.

(10) Patent No.: US 12,522,250 B2
(45) Date of Patent: Jan. 13, 2026

(54) VEHICLE CONTROL APPARATUS, VEHICLE CONTROL METHOD, AND NON-TRANSITORY STORAGE MEDIUM

(71) Applicant: NEC Corporation, Tokyo (JP)

(72) Inventors: Tsukasa Kasuya, Tokyo (JP); Tomoaki Tanaka, Tokyo (JP); Norihiro Ide, Tokyo (JP); Kouichi Ono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 343 days.

(21) Appl. No.: 18/034,019

(22) PCT Filed: Nov. 6, 2020

(86) PCT No.: PCT/JP2020/041499
§ 371 (c)(1),
(2) Date: Apr. 26, 2023

(87) PCT Pub. No.: WO2022/097264
PCT Pub. Date: May 12, 2022

(65) Prior Publication Data
US 2023/0382431 A1 Nov. 30, 2023

(51) Int. Cl.
*B60W 60/00* (2020.01)
*B60W 50/08* (2020.01)
*B60W 50/14* (2020.01)

(52) U.S. Cl.
CPC ........ *B60W 60/005* (2020.02); *B60W 50/082* (2013.01); *B60W 50/14* (2013.01); *B60W 2540/00* (2013.01)

(58) Field of Classification Search
None
See application file for complete search history.

(56) References Cited

U.S. PATENT DOCUMENTS 10,384,601 B1 * 8/2019 Ricketts ............... B60W 50/14
2019/0016188 A1   1/2019 Hachisuka et al.
(Continued)

FOREIGN PATENT DOCUMENTS

JP   2017-199123 A   11/2017
JP   2019-182012 A   10/2019
(Continued)

OTHER PUBLICATIONS

Machine translation of JP 20200116999 A1 (Year: 2020).*
International Search Report for PCT Application No. PCT/JP2020/041499, mailed on Dec. 22, 2020.

*Primary Examiner* — James J Lee
*Assistant Examiner* — David Hatch
(74) *Attorney, Agent, or Firm* — Sughrue Mion, PLLC (57) ABSTRACT

The present invention provides a vehicle control apparatus (10) including: an acquisition unit (11) that acquires internal situation information indicating a situation inside a vehicle; a detection unit (12) that detects a person who satisfies a predetermined condition inside the vehicle, based on the internal situation information; a decision unit (13) that decides a driving mode of the vehicle, based on whether the person who satisfies the predetermined condition is detected; a processing unit (14) that performs processing of the decided driving mode; and a notification unit (15) that notifies an outside of the vehicle of the decided driving mode.

10 Claims, 4 Drawing Sheets

(56) References Cited

U.S. PATENT DOCUMENTS

| | | | | |
|---|---|---|---|---|
| 2019/0265703 A1* | 8/2019 | Hicok | .................... | G06Q 10/02 |
| 2020/0231183 A1 | 7/2020 | Akita | | |
| 2021/0107421 A1* | 4/2021 | Uno | ..................... | B60W 40/08 |

FOREIGN PATENT DOCUMENTS

| | | | | | |
|---|---|---|---|---|---|
| JP | 2019-215780 A | | 12/2019 | | |
| JP | 2020-086801 A | | 6/2020 | | |
| JP | 2020116999 A | * | 8/2020 | .......... | B60W 30/182 |
| WO | 2017/169203 A1 | | 10/2017 | | |

\* cited by examiner

VEHICLE CONTROL APPARATUS, VEHICLE CONTROL METHOD, AND NON-TRANSITORY STORAGE MEDIUM

This application is a National Stage Entry of PCT/JP2020/041499 filed on Nov. 6, 2020, the contents of all of which are incorporated herein by reference, in their entirety.

TECHNICAL FIELD

The present invention relates to a vehicle control apparatus, a vehicle control method, and a program.

BACKGROUND ART

A technique related to the present invention is disclosed in Patent Documents 1 and 2.

Patent Document 1 discloses a technique related to automatic driving of a vehicle and a technique for switching a driving mode of the vehicle according to a situation inside the vehicle, a driving situation of the vehicle, a surrounding environment, and the like. Specifically, Patent Document 1 discloses that a situation during operating a smartphone, a standing situation, a situation with many passengers, and the like are detected, and a driving mode is switched according to the detected situation.

Patent Document 2 discloses a technique related to automatic driving of a vehicle and a technique for deciding a driving mode according to a position, a line of sight, an action state, a posture, an expression, the number of riding people, and an attribute (such as age and gender) of a passenger.

RELATED DOCUMENT

Patent Document

[Patent Document 1] International Patent Publication No. WO2017/169203
[Patent Document 2] Japanese Patent Application Publication No. 2020-086801

DISCLOSURE OF THE INVENTION

Technical Problem

In an automatic driving technique of a vehicle, a technique for preventing not only an accident between an own vehicle and a surrounding object (such as another vehicle, a passerby, and an installed object) but also an accident (such as a fall of a standing person) inside the own vehicle is desired. As in the techniques disclosed in Patent Documents 1 and 2, an accident inside an own vehicle can be suppressed by surveying a situation inside a vehicle and deciding a driving mode according to the situation. However, the present inventor has found out the following problem in the technique for deciding a driving mode according to a situation inside a vehicle.

In general, a situation inside a vehicle is less likely to be informed to the outside of the vehicle. Thus, when a driving mode is decided according to the situation inside the vehicle, there is a problem that a person outside the vehicle cannot recognize a reason for such traveling. Then, there is a risk that the situation induces irritation of the person outside the vehicle and leads to an accident.

For example, when a front vehicle travels at a low velocity, low acceleration, low deceleration, or the like, and hinders his/her own smooth traveling, some persons get irritated unless the persons cannot recognize a reason for such traveling of the front vehicle. Then, an accident is more likely to occur due to driving in such a mental state.

In this way, in the technique for deciding a driving mode according to a situation inside a vehicle, although an accident inside an own vehicle can be suppressed, there is a risk that a probability of occurring an accident between the own vehicle and another vehicle, an accident outside the own vehicle, and the like increases.

The present invention has a challenge to provide a technique for suppressing an accident inside an own vehicle while suppressing an inconvenience of increasing a probability of occurring an accident between the own vehicle and another vehicle and an accident outside the own vehicle.

Solution to Problem

A vehicle control apparatus according to an example aspect of the invention includes:
an acquisition unit that acquires internal situation information indicating a situation inside a vehicle;
a detection unit that detects a person who satisfies a predetermined condition inside the vehicle, based on the internal situation information;
a decision unit that decides a driving mode of the vehicle, based on whether the person is detected;
a processing unit that performs processing of the decided driving mode; and
a notification unit that notifies an outside of the vehicle of the decided driving mode.

Further, a vehicle control method according to an example aspect of the invention includes, by a computer:
acquiring internal situation information indicating a situation inside a vehicle;
detecting a person who satisfies a predetermined condition inside the vehicle, based on the internal situation information;
deciding a driving mode of the vehicle, based on whether the person is detected;
performing processing of the decided driving mode; and
notifying an outside of the vehicle of the decided driving mode.

Further, a program according to an example aspect of the invention, causing a computer to function as:
an acquisition unit that acquires internal situation information indicating a situation inside a vehicle;
a detection unit that detects a person who satisfies a predetermined condition inside the vehicle, based on the internal situation information;
a decision unit that decides a driving mode of the vehicle, based on whether the person is detected;
a processing unit that performs processing of the decided driving mode; and
a notification unit that notifies an outside of the vehicle of the decided driving mode.

Advantageous Effects of Invention

The present invention can achieve a technique for suppressing an accident inside an own vehicle while suppressing an inconvenience of increasing a probability of occurring an accident between the own vehicle and another vehicle and an accident outside the own vehicle.

DESCRIPTION OF EMBODIMENTS

Hereinafter, example embodiments of the present invention will be described with reference to the drawings. Note that, in all of the drawings, a similar component has a similar reference sign, and description thereof will be appropriately omitted.

First Example Embodiment

Outline

A vehicle control apparatus according to the present example embodiment decides a driving mode of an own vehicle (a vehicle on which the vehicle control apparatus is mounted and that is controlled by the vehicle control apparatus), based on a situation inside the own vehicle. Then, the vehicle control apparatus notifies the outside of the own vehicle of the decided driving mode by using a means such as vehicle-to-vehicle communication, road-to-vehicle communication, and display on a display provided outside the own vehicle. For example, when traveling in a safer safety driving mode (at a low velocity, low acceleration, low deceleration, or the like) is decided based on a situation inside an own vehicle, traveling in the safety driving mode is notified to the outside.

In this way, the vehicle control apparatus according to the present example embodiment that decides a driving mode of an own vehicle, based on a situation inside the own vehicle, can suppress an accident inside the own vehicle. Further, with the vehicle control apparatus according to the present example embodiment that notifies the outside of a driving mode of an own vehicle, a person outside the own vehicle can recognize a reason for such traveling. As a result, irritation of the person outside the own vehicle can be suppressed, and an accident caused by the irritation can be suppressed.

In this way, the vehicle control apparatus according to the present example embodiment can suppress an accident inside an own vehicle while suppressing an inconvenience of increasing a probability of occurring an accident between the own vehicle and another vehicle and an accident outside the own vehicle.

Configuration

Next, a configuration of the vehicle control apparatus will be described. First, one example of a hardware configuration of the vehicle control apparatus will be described. Each functional unit of the vehicle control apparatus is achieved by any combination of hardware and software concentrating on a central processing unit (CPU) of any computer, a memory, a program loaded into the memory, a storage unit (that can also store a program downloaded from a storage medium such as a compact disc (CD), a server on the Internet, and the like in addition to a program previously stored at a stage of shipping of an apparatus) such as a hard disk that stores the program, and a network connection interface. Then, various modification examples of an achievement method and an apparatus thereof are understood by a person skilled in the art.

Figure 1:
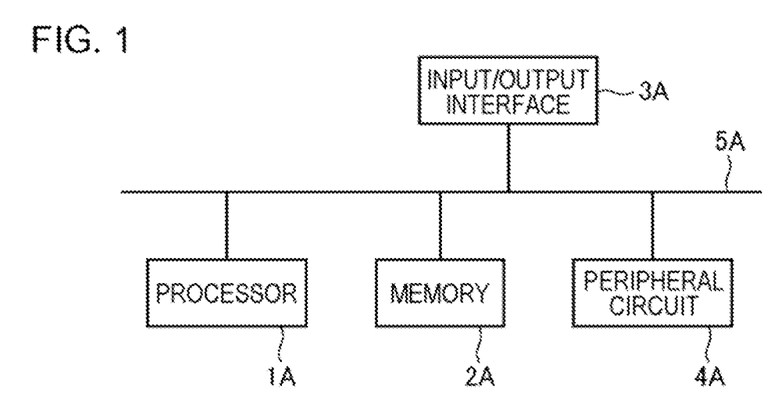
FIG. 1 is one example of a hardware configuration diagram of a vehicle control apparatus according to the present example embodiment.

FIG. 1 is a block diagram illustrating the hardware configuration of the vehicle control apparatus. As illustrated in FIG. 1, the vehicle control apparatus includes a processor 1A, a memory 2A, an input/output interface 3A, a peripheral circuit 4A, and a bus 5A. Various modules are included in the peripheral circuit 4A. The vehicle control apparatus may not include the peripheral circuit 4A. Note that, the vehicle control apparatus may be formed of a plurality of apparatuses separated physically and/or logically, or may be formed of one apparatus integrated physically and/or logically. When the vehicle control apparatus is formed of a plurality of apparatuses separated physically and/or logically, each of the plurality of apparatuses can include the hardware configuration described above.

The bus 5A is a data transmission path for the processor 1A, the memory 2A, the peripheral circuit 4A, and the input/output interface 3A to transmit and receive data to and from one another. The processor 1A is an arithmetic processing apparatus such as a CPU and a graphics processing unit (GPU), for example. The memory 2A is a memory such as a random access memory (RAM) and a read only memory (ROM), for example. The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can output an instruction to each of modules, and perform an arithmetic operation, based on an arithmetic result of the modules.

Next, a functional configuration of the vehicle control apparatus will be described. The vehicle control apparatus is mounted on a vehicle, and controls processing related to the vehicle, and the like. Hereinafter, a vehicle on which the vehicle control apparatus is mounted and that is controlled by the vehicle control apparatus may be referred to as an "own vehicle" for a distinction from another vehicle.

The vehicle control apparatus is mounted on a vehicle having an automatic driving function of allowing a system of the vehicle to control a handle, an accelerator, a brake, and the like, and traveling under the control. A kind of a vehicle on which the vehicle control apparatus is mounted is not particularly limited. However, the vehicle control apparatus is suitable for an application to a bus, a train, a large-sized vehicle, and the like in which a person in a standing state can ride and thus an accident inside is more likely to occur.

Figure 2:
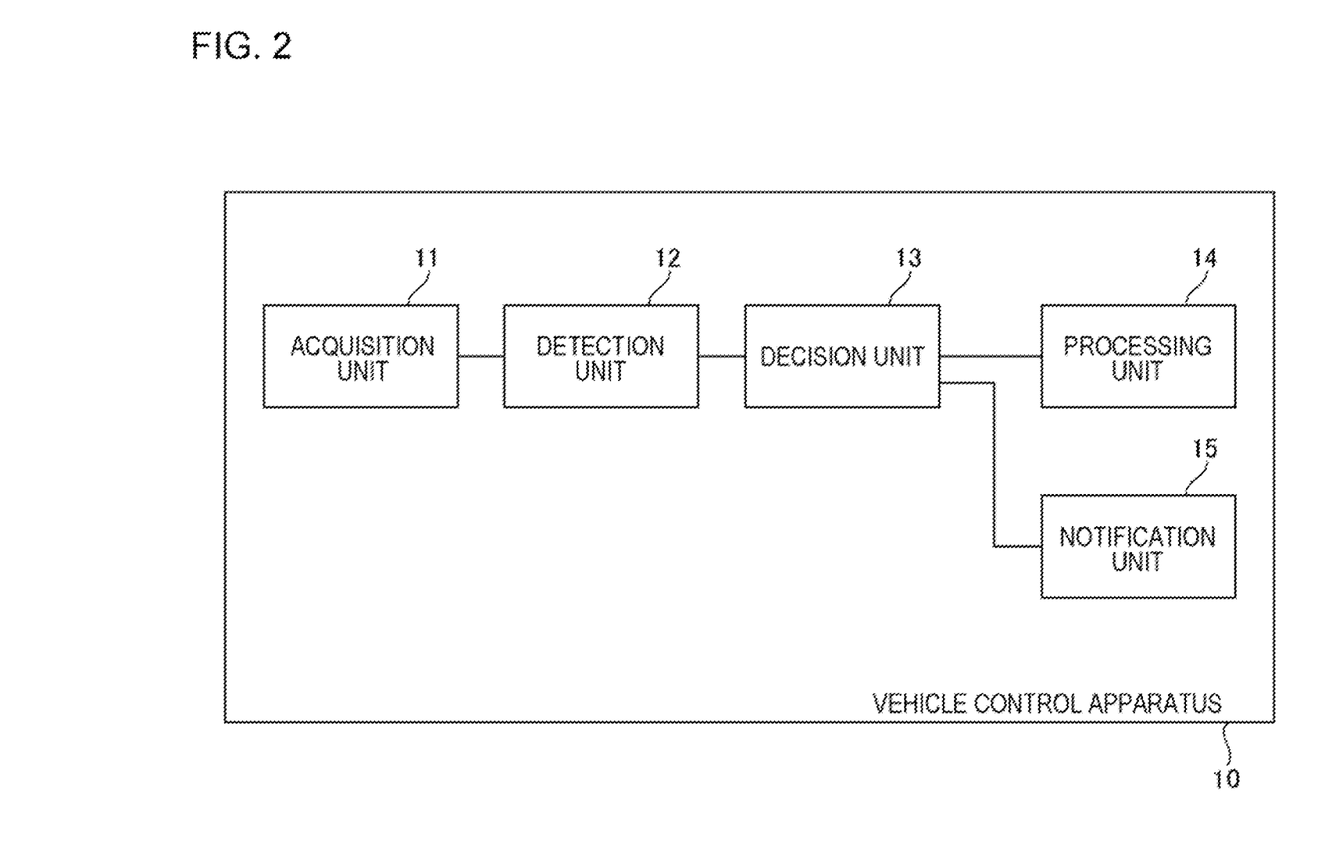
FIG. 2 is one example of a functional block diagram of the vehicle control apparatus according to the present example embodiment.

FIG. 2 illustrates one example of a functional block diagram of a vehicle control apparatus 10. As illustrated, the vehicle control apparatus 10 includes an acquisition unit 11, a detection unit 12, a decision unit 13, a processing unit 14, and a notification unit 15.

The acquisition unit 11 acquires internal situation information indicating a situation inside an own vehicle. First, information generation apparatus that generates the internal situation information indicating a situation inside the own vehicle is installed inside the own vehicle. For example, the information generation apparatus may be a camera that captures the inside of the own vehicle, may be a sensor that detects a person holding a strap or a handrail, may be a sensor that detects use of an instrument to which a wheelchair is fixed, or may be other.

The vehicle control apparatus 10 and the information generation apparatus are communicably connected in a wired and/or wireless manner. Then, the acquisition unit 11 acquires, by real time processing (by as small a time lag from a generation timing as possible), the internal situation information generated by the information generation apparatus.

The detection unit 12 detects a person who satisfies a predetermined condition inside the own vehicle, based on the internal situation information. The predetermined condition is a state where an accident is more likely to occur inside the own vehicle. For example, the predetermined condition is a condition based on at least one of presence or absence of riding in a standing state, presence or absence of holding of a strap or a handrail, presence or absence of use of a wheelchair, and an estimated age. The predetermined condition may be one of (1) to (5) below, or some of (1) to (5) being connected by a logical operator. Note that, the exemplification herein is merely one example and does not exclude the other condition.

(1): Standing,
(2): standing and not holding a strap or a handrail,
(3): standing and holding an object other than a strap or a handrail with at least one of hands,
(4): satisfying any of (1) to (3) and an estimated age falls within a reference range,
(5): riding in a wheelchair.

These states can be detected based on an image analysis and a sensing result by the sensor described above. Further, an age can be estimated by an image analysis. The reference range of an age in (4) is defined in such a way as to include a child and an old person who are more likely to fall, such as "10 years old or younger or 75 years old or older", for example.

The decision unit 13 decides a driving mode of the own vehicle, based on whether a person who satisfies the predetermined condition described above is detected inside the own vehicle. Specifically, when a person who satisfies the predetermined condition described above is detected inside the own vehicle, the decision unit 13 decides a safety driving mode. Then, when a person who satisfies the predetermined condition described above is not detected inside the own vehicle, the decision unit 13 decides another driving mode. The another driving mode is, for example, a normal mode in which a special limit is not present in automatic driving, and the like. Note that, the another driving mode may be one or plural. In the latter case, one driving mode is decided from a plurality of the another driving modes by any means.

The safety driving mode during the automatic driving is a mode of traveling under a limit for suppressing an accident inside the own vehicle. In other words, traveling of the own vehicle is controlled in such a way as to satisfy the limit.

In the safety driving mode, control is performed in such a way that at least one of a velocity, a velocity during a right turn and a left turn, acceleration during accelerating, deceleration during decelerating, and a change velocity (a change amount per unit time) of a steering angle of a handle of the own vehicle is smaller than that in the another driving mode. For example, during the safety driving mode, a limit such as a "velocity equal to or less than a threshold value", a "velocity during a right turn and a left turn equal to or less than a threshold value", "acceleration during accelerating equal to or less than a threshold value", "deceleration during decelerating equal to or less than a threshold value", or a "change velocity (a change amount per unit time) of a steering angle of a handle equal to or less than a threshold value" is imposed. The threshold value is set smaller than a velocity, a velocity during a right turn and a left turn, acceleration during accelerating, deceleration during decelerating, a change velocity of a steering angle of a handle, and the like of the own vehicle in the another driving mode.

The processing unit 14 performs processing in the decided driving mode. Specifically, the processing unit 14 inputs a signal indicating the decided driving mode to an electronic control unit (ECU) involved in the automatic driving. The ECU controls traveling of the own vehicle in the decided driving mode. For example, when the safety driving mode is decided, the ECU controls traveling of the own vehicle under the limit such as a "velocity equal to or less than the threshold value", a "velocity during a right turn and a left turn equal to or less than the threshold value", "acceleration during accelerating equal to or less than the threshold value", "deceleration during decelerating equal to or less than the threshold value", or a "change velocity (a change amount per unit time) of a steering angle of a handle equal to or less than the threshold value". Further, when the another driving mode is decided, the ECU controls traveling of the own vehicle under a situation without such a limit related to the safety driving mode.

The notification unit 15 notifies the outside of the own vehicle of the driving mode (such as the safety driving mode) decided by the decision unit 13. Note that, the notification unit 15 may notify the outside of the own vehicle of the driving mode decided by the decision unit 13 only when the safety driving mode is decided, and the notification unit 15 may not notify the outside of the own vehicle of the driving mode decided by the decision unit 13 when the another driving mode is decided.

The notification unit 15 can notify the outside of the own vehicle of the decided driving mode by using at least one means of wireless communication, and display on a display provided outside the own vehicle. The wireless communication includes general wireless communication such as vehicle-to-vehicle communication, road-to-vehicle communication, a wireless local area network (LAN), and mobile communication. A specific example of each of the means will be described below.

When the vehicle-to-vehicle communication or the road-to-vehicle communication is used, a current driving mode, a vehicle type (such as a bus) of the own vehicle, current position information (such as GPS information) about the own vehicle, traveling position history information about the own vehicle, current traveling information (such as a velocity) about the own vehicle, road information around a current position of the own vehicle, information indicating whether the own vehicle travels by the automatic driving or manual driving, and the like are transmitted from the own vehicle to a surrounding vehicle. Note that, a part of the information exemplified herein may be transmitted, or all of the information may be transmitted. The notification unit 15 can repeatedly transmit the information described above to a surrounding vehicle at a predetermined time interval.

When the general wireless communication such as the wireless LAN and the mobile communication is used, a management apparatus is present in, for example, a remote place (a position away from the own vehicle). The management apparatus recognizes position information about a preregistered vehicle by regularly acquiring the position information from each vehicle, and the like. The own vehicle transmits information (such as position information) to the remote management apparatus via the general wireless communication. The remote management apparatus determines a surrounding vehicle, based on the received position information about the own vehicle and position information about another recognized vehicle, and transmits the information to the surrounding vehicle.

For example, the vehicle that receives the information can output at least a part of the received information via an output apparatus such as a display, a projection apparatus, and a speaker. In addition, the vehicle that receives the information may transmit the information to a portable device (such as a smartphone, a tablet terminal, a smartwatch, a cellular phone, and a portable game) of a passenger by short-range wireless communication, wired communication, or the like. For example, the vehicle that receives the information may notify the surroundings of presence of a vehicle traveling in a predetermined driving mode. Further, the vehicle that receives the information may notify the surroundings of presence of a vehicle traveling by the automatic driving. Further, the vehicle that receives the information may use the received information for a decision and processing of a driving mode of its own vehicle (the vehicle that receives the information). For example, the vehicle that receives the information may decide that its own vehicle (the vehicle that receives the information) also travels in the safety driving mode, and may suppress a velocity and the like.

Note that, the vehicle that receives the information may perform the notification described above only when a predetermined condition is satisfied. The predetermined condition is that a vehicle traveling in the predetermined driving mode may prevent traveling of the vehicle that receives the information. For example, the vehicle that receives the information may determine whether a vehicle being an information transmission source is located ahead and whether a traveling direction is the same as that of the vehicle being the information transmission source, based on the received information. Then, when the vehicle traveling in the predetermined driving mode is present ahead, and the traveling direction is the same as that of the vehicle being the information transmission source, the vehicle that receives the information may perform the notification described above.

When the display on the display provided outside the own vehicle is used, the display is installed in a position that can be visually recognized from the outside of the own vehicle. Then, a current driving mode, the information indicating whether the own vehicle travels by the automatic driving or the manual driving, and the like are displayed on the display. Note that, when the driving mode switches, a different aspect may be displayed. For example, when the driving mode is switched to the safety driving mode, "driving mode is switched to safety driving mode" may be displayed. Further, the display may be blinked. With the display in such a different aspect, attention from the outside can be attracted, and the switching is easily recognized from the outside.

Note that, the notification unit 15 may further notify a passenger of the own vehicle of the decided driving mode. When the own vehicle is a vehicle assumed to be ridden by a passenger, such as a bus and a train, a passenger being a notification target is at least one of a manager (such as a driver, an assistant, and a conductor of the train) and a fare of the own vehicle. The notification unit 15 may display a current driving mode on a display installed in a position that can be visually recognized by a passenger of the own vehicle. In addition, the notification unit 15 may output the information indicating a current driving mode via a speaker that outputs a sound to a passenger of the own vehicle.

Figure 3:
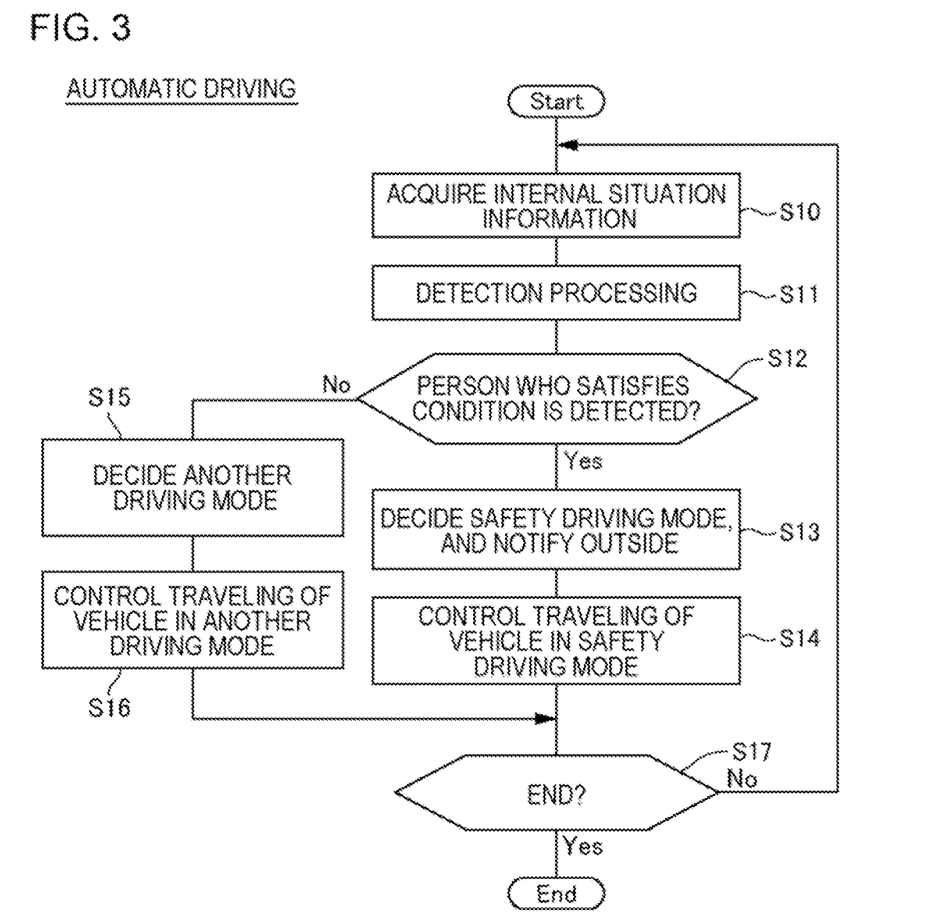
FIG. 3 is a flowchart illustrating one example of a flow of processing of the vehicle control apparatus according to the present example embodiment.

Next, one example of a flow of processing of the vehicle control apparatus 10 will be described by using a flowchart in FIG. 3. The processing is processing performed while an own vehicle travels by the automatic driving. In the processing, only when the safety driving mode is decided, the notification unit 15 notifies the outside of the own vehicle of the decision. Note that, the example is merely one example, and the notification unit 15 may also notify the outside of the own vehicle of the decided driving mode when the another driving mode is decided.

First, the acquisition unit 11 acquires internal situation information indicating a situation inside the own vehicle (S10). Next, the detection unit 12 performs processing of detecting a person who satisfies the predetermined condition inside the own vehicle, based on the internal situation information (S11). Since the predetermined condition is described above, description herein will be omitted.

When the person who satisfies the predetermined condition is detected (Yes in S12), the decision unit 13 decides the safety driving mode (S13). In response to the decision, the notification unit 15 notifies the outside of the own vehicle of traveling in the safety driving mode (S13). Further, in response to the decision, the decided driving mode may be notified to a driver or a manager of the own vehicle. The notification is achieved via, for example, a display installed in a position that can be visually recognized by the driver or the manager of the own vehicle, or a speaker that outputs a sound to the person. Then, the processing unit 14 inputs a signal indicating the decided driving mode to an ECU involved in the automatic driving. The ECU controls traveling of the own vehicle in the decided driving mode (S14).

On the other hand, when the person who satisfies the predetermined condition is not detected (No in S12), the decision unit 13 decides another driving mode (S15). In response to the decision, the decided driving mode may be notified to the driver or the manager of the own vehicle. The notification is achieved via, for example, the display installed in the position that can be visually recognized by the driver or the manager of the own vehicle, or the speaker that outputs a sound to the person. Then, the processing unit 14 inputs a signal indicating the decided driving mode to the ECU involved in the automatic driving. The ECU controls traveling of the own vehicle in the decided driving mode (S16). Hereinafter, similar processing is repeated.

Advantageous Effect

As described above, the vehicle control apparatus 10 that decides a driving mode of an own vehicle, based on a situation inside the own vehicle can suppress an accident inside the own vehicle. Further, with the vehicle control apparatus 10 that notifies the outside of a driving mode of the own vehicle, a person outside the own vehicle can recognize a reason for such traveling. As a result, irritation of the person outside the own vehicle can be suppressed, and an accident caused by the irritation can be suppressed.

In this way, the vehicle control apparatus 10 can suppress an accident inside the own vehicle while suppressing an inconvenience of increasing a probability of occurring an accident between the own vehicle and another vehicle and an accident outside the own vehicle. Further, by notifying the outside of traveling in the safety driving mode, an image of a company or an organization can be improved when the own vehicle is a vehicle of the company or the organization.

Further, with the vehicle control apparatus 10 that can notify a passenger of the own vehicle of a driving mode of the own vehicle, the passenger of the own vehicle can recognize a current driving mode of the vehicle ridden by himself/herself. Thus, a preparation or a way of riding according to the driving mode can be performed. As a result, an accident inside the own vehicle can be suppressed.

Second Example Embodiment

In the present example embodiment, an own vehicle can switch between automatic driving and manual driving. The manual driving is a function of allowing a driver (person) of the vehicle to control a handle, an accelerator, a brake, and the like, and causing the vehicle to travel under the control.

During the manual driving similarly to the automatic driving, a vehicle control apparatus 10 also performs processing of acquiring internal situation information, processing of detecting a person who satisfies a predetermined condition inside the own vehicle, based on the internal situation information, and processing of deciding a driving mode (such as a normal driving mode), based on whether the person who satisfies the predetermined condition is detected.

However, a content of processing performed during a safety driving mode, and a timing at which traveling in the safety driving mode is notified to the outside of the own vehicle are different from those during the automatic driving.

First, the content of the processing performed during the safety driving mode will be described. When the safety driving mode is decided during the manual driving, a processing unit 14 surveys whether it is satisfied that at least one of a velocity, a velocity during a right turn and a left turn, acceleration during accelerating, deceleration during decelerating, and a change velocity of a steering angle of a handle of the own vehicle is equal to or less than a threshold value, and the processing unit 14 gives a warning to a driver of the own vehicle when it is not satisfied. The warning is achieved via an output apparatus such as a display, a speaker, and a warning lamp installed in the own vehicle.

Next, the timing at which traveling in the safety driving mode is notified to the outside of the own vehicle will be described. After the safety driving mode is decided by a decision unit 13, a notification unit 15 notifies the outside of the own vehicle of the decided safety driving mode in response to detection that at least one measurement value of a velocity, a velocity during a right turn and a left turn, acceleration during accelerating, deceleration during decelerating, and a change velocity of a steering angle of the handle of the own vehicle satisfies a notification condition (predetermined reference).

The notification condition is that traveling of the own vehicle is safe traveling similar to traveling in the safety driving mode during the automatic driving. For example, the notification condition may be a "measurement value being equal to or less than the threshold value is satisfied once", a "measurement value being equal to or less than the threshold value is satisfied for N or more times (N is an integer of two or more)", a "measurement value being equal to or less than the threshold value is consecutively satisfied for N or more times", a "measurement value does not exceed the threshold value during a period of time T", or may be other.

Figure 4:
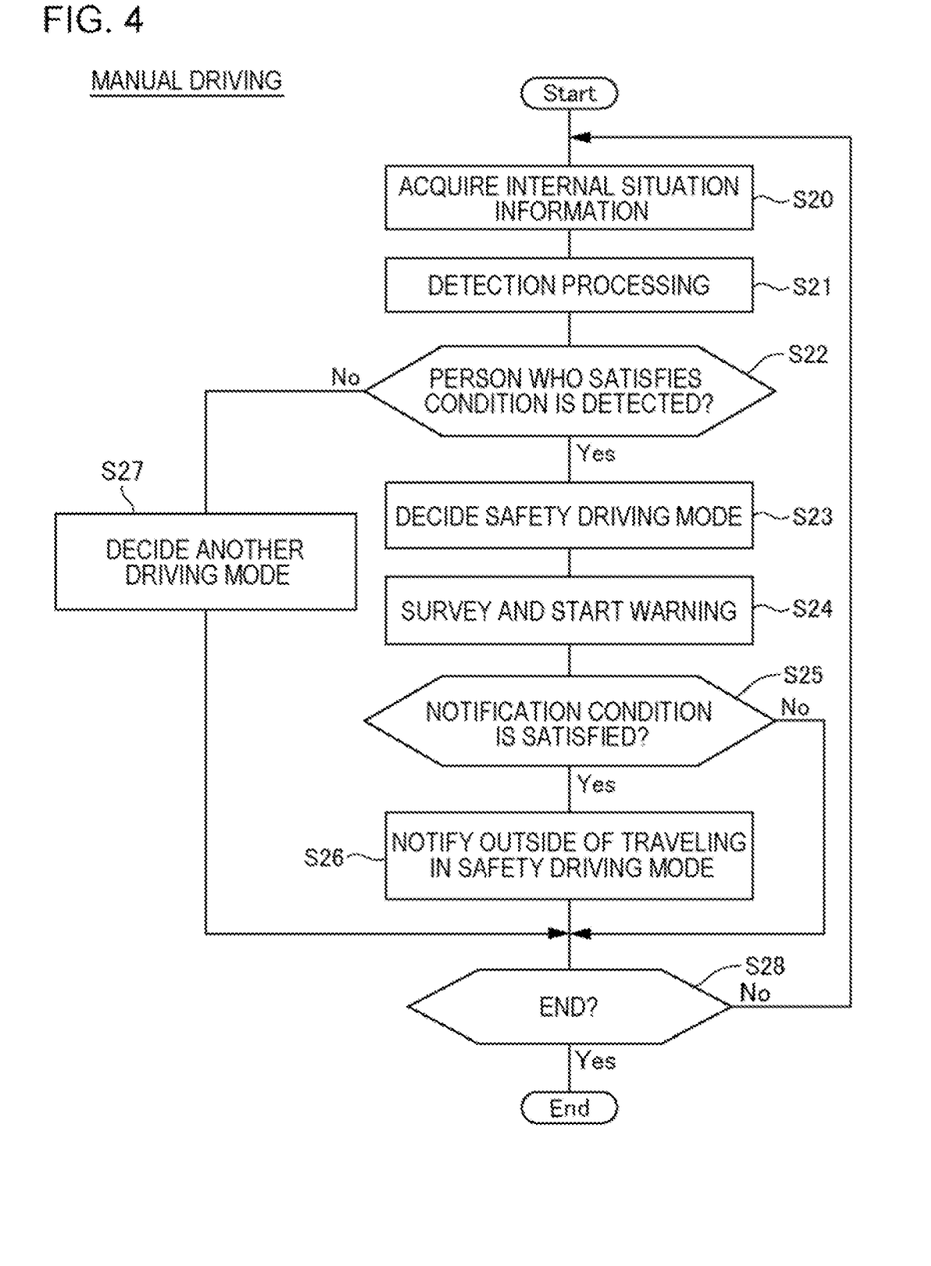
FIG. 4 is a flowchart illustrating one example of a flow of processing of the vehicle control apparatus according to the present example embodiment.

Next, one example of a flow of processing of the vehicle control apparatus 10 will be described by using a flowchart in FIG. 4. The processing is processing performed while an own vehicle travels by the manual driving. In the processing, only when the safety driving mode is decided, the notification unit 15 notifies the outside of the own vehicle of the decision. Note that, the example is merely one example, and the notification unit 15 may also notify the outside of the own vehicle of the decided driving mode when the another driving mode is decided.

First, an acquisition unit 11 acquires internal situation information indicating a situation inside the own vehicle (S20). Next, a detection unit 12 performs processing of detecting a person who satisfies the predetermined condition inside the own vehicle, based on the internal situation information (S21). Since the predetermined condition is described in the first example embodiment, description herein will be omitted.

When the person who satisfies the predetermined condition is detected (Yes in S22), the decision unit 13 decides the safety driving mode (S23). In response to the decision, the decided driving mode may be notified to a driver or a manager of the own vehicle. The notification is achieved via, for example, a display installed in a position that can be visually recognized by the driver or the manager of the own vehicle, or a speaker that outputs a sound to the person.

Then, the processing unit 14 surveys whether it is satisfied that at least one of a velocity, a velocity during a right turn and a left turn, acceleration during accelerating, deceleration during decelerating, and a change velocity of a steering angle of a handle of the own vehicle is equal to or less than the threshold value, and the processing unit 14 starts processing of giving a warning to the driver of the own vehicle when it is not satisfied (S24).

Further, after the safety driving mode is decided by the decision unit 13, the notification unit 15 starts to survey whether at least one measurement value of a velocity, a velocity during a right turn and a left turn, acceleration during accelerating, deceleration during decelerating, and a change velocity of a steering angle of the handle of the own vehicle satisfies a notification condition. Herein, for example, the notification condition is that at least one measurement value of a velocity, a velocity during a right turn and a left turn, acceleration during accelerating, deceleration during decelerating, and a change velocity of a steering angle of the handle of the own vehicle satisfies the predetermined reference. Then, when the notification condition is satisfied (Yes in S25), the notification unit 15 notifies the outside of the own vehicle of traveling in the safety driving mode (S26). Note that, even when the safety driving mode is decided, in a case where the notification condition is not satisfied (No in S25), the notification unit 15 does not notify the outside of the own vehicle of traveling in the safety driving mode.

On the other hand, when the person who satisfies the predetermined condition is not detected (No in S22), the decision unit 13 decides the another driving mode (S27). In response to the decision, the decided driving mode may be notified to the driver or the manager of the own vehicle. The notification is achieved via, for example, the display installed in the position that can be visually recognized by the driver or the manager of the own vehicle, or the speaker that outputs a sound to the person. Note that, when the surveillance and warning processing described in S24 and S25 is performed at a point in time at which the another driving mode is decided, i.e., when the own vehicle is traveling in the safety driving mode until immediately before the decision, the surveillance and warning processing described in S24 and S25 is stopped in response to the decision of the another driving mode. Hereinafter, similar processing is repeated.

Another configuration of the vehicle control apparatus 10 according to the present example embodiment is similar to that in the first example embodiment. The vehicle control apparatus 10 according to the present example embodiment can achieve an advantageous effect similar to that in the first example embodiment.

Further, when the safety driving mode is decided, the vehicle control apparatus 10 that surveys whether it is satisfied that at least one of a velocity, a velocity during a right turn and a left turn, acceleration during accelerating, deceleration during decelerating, and a change velocity of a steering angle of a handle of an own vehicle is equal to or less than the threshold value, and that gives a warning to a driver of the own vehicle when it is not satisfied can lead the driver to safer driving in a state where an accident inside the vehicle is more likely to occur. As a result, an accident inside the own vehicle can be effectively suppressed.

Further, in a case of the automatic driving, traveling of the own vehicle is rapidly switched to traveling at a velocity, a velocity during a right turn and a left turn, acceleration during accelerating, deceleration during decelerating, a change velocity of a steering angle of the handle of the own vehicle, and the like smaller than those in the another driving mode in response to the decision of the safety driving mode, but, in a case of the manual driving, a driver controls the handle, an accelerator, a brake, and the like, and thus traveling of the own vehicle is not necessarily switched rapidly as described above even when the safety driving mode is decided.

Meanwhile, when the decision of the safety driving mode is notified to the outside of the own vehicle, a person outside the own vehicle recognizes, based on the notification, that the vehicle being a transmission source of the notification more safely drives at a velocity, a velocity during a right turn and a left turn, acceleration during accelerating, deceleration during decelerating, a change velocity of the steering angle of the handle, and the like to be reduced.

Thus, when the decision is notified to the outside of the own vehicle in response to the decision of the safety driving mode in the automatic driving, a difference between actual traveling of the own vehicle and recognition from the outside occurs, and there is a risk that the difference leads to an accident and the like.

In order to avoid the inconvenience, when the safety driving mode is decided during the automatic driving, the vehicle control apparatus 10 surveys whether at least one measurement value of a velocity, a velocity during a right turn and a left turn, acceleration during accelerating, deceleration during decelerating, and a change velocity of a steering angle of a handle of an own vehicle satisfies a notification condition after the decision, and notifies the outside of the own vehicle of the decided safety driving mode in response to detection of the notification condition being satisfied. In this way, the inconvenience that the difference as described above between actual traveling of the own vehicle and recognition from the outside occurs can be suppressed.

Modification Example

Modification Example 1

In the second example embodiment, it is assumed that an own vehicle has functions of both of the automatic driving and the manual driving, and the functions can be switched, but the own vehicle may have only the function of the manual driving.

Modification Example 2

The decision unit 13 may further decide a driving mode of an own vehicle, based on the number of detected persons who satisfy a predetermined condition. For example, the decision unit 13 may decide the safety driving mode when the number of detected persons described above is equal to or more than M. M is a predetermined integer, and may be one or may be equal to or more than two.

In addition, the decision unit 13 may decide a control content of the automatic driving according to the number of detected persons. Specifically, the decision unit 13 may perform control in such a way that at least one of a velocity, a velocity during a right turn and a left turn, acceleration during accelerating, deceleration during decelerating, and a change velocity of a steering angle of a handle of an own vehicle is smaller with a greater number of detected persons.

Further, the decision unit 13 may decide a surveillance content during the manual driving according to the number of detected persons. Specifically, as described in the second example embodiment, when the safety driving mode is decided during the manual driving, the processing unit 14 surveys whether it is satisfied that at least one of a velocity, a velocity during a right turn and a left turn, acceleration during accelerating, deceleration during decelerating, and a change velocity of a steering angle of a handle of an own vehicle is equal to or less than a threshold value, and the processing unit 14 gives a warning to a driver of the own vehicle when it is not satisfied. The decision unit 13 may reduce the threshold value with a greater number of detected persons.

Modification Example 3

In the second example embodiment, during the manual driving, after the safety driving mode is decided, the notification unit 15 notifies the outside of an own vehicle of the decided driving mode in response to a predetermined notification condition being satisfied. As a modification example, during the manual driving, the notification unit 15 may notify the outside of an own vehicle of a decided driving mode in response to decision of the safety driving mode. In other words, the notification unit 15 does not survey whether a notification condition is satisfied, and, when the safety driving mode is decided, the notification unit 15 may rapidly notify the decided driving mode to the outside of the own vehicle in response to the decision. When a driver is sufficiently educated, it is conceivable that the driver rapidly switches to traveling controlled in such a way that a velocity, a velocity during a right turn and a left turn, acceleration during accelerating, deceleration during decelerating, a change velocity of a steering angle of a handle of the own vehicle, and the like are equal to or less than a threshold value in response to the decision of the safety driving mode. Thus, even when a decided driving mode is notified to the outside of an own vehicle in response to decision of the safety driving mode, the inconvenience as described in the second example embodiment that a difference between actual traveling of the own vehicle and recognition from the outside occurs does not occur.

Note that, an advantageous effect similar to that in the example embodiments described above is also achieved in the modification examples.

Note that, in the present specification, "acquisition" includes at least any one of "acquisition of data stored in another apparatus or a storage medium by its own apparatus (active acquisition)", based on a user input or an instruction of a program, such as reception by making a request or an inquiry to another apparatus and reading by accessing to another apparatus or a storage medium, "inputting of data output to its own apparatus from another apparatus (passive acquisition)", based on a user input or an instruction of a program, such as reception of data to be distributed (transmitted, push-notified, or the like) and acquisition by selection from among received data or received information, and "generation of new data by editing data (such as texting, sorting of data, extraction of a part of data, and change of a file format) and the like, and acquisition of the new data".

A part or the whole of the above-described example embodiments may also be described as in supplementary notes below, which is not limited thereto.

1. A vehicle control apparatus including:
    an acquisition unit that acquires internal situation information indicating a situation inside a vehicle;
    a detection unit that detects a person who satisfies a predetermined condition inside the vehicle, based on the internal situation information;
    a decision unit that decides a driving mode of the vehicle, based on whether the person is detected;
    a processing unit that performs processing of the decided driving mode; and
    a notification unit that notifies an outside of the vehicle of the decided driving mode.

2. The vehicle control apparatus according to supplementary note 1, wherein
    the notification unit further notifies a passenger of the vehicle of the decided driving mode.

3. The vehicle control apparatus according to supplementary note 1 or 2, wherein
    the predetermined condition is a condition based on at least one of presence or absence of riding in a standing state, presence or absence of holding of a strap or a handrail, presence or absence of use of a wheelchair, and an estimated age.

4. The vehicle control apparatus according to any of supplementary notes 1 to 3, wherein
    the decision unit decides a safety driving mode as a driving mode of the vehicle when a person who satisfies the predetermined condition is detected, and,
    when the safety driving mode is decided during automatic driving in which a system of the vehicle controls traveling of the vehicle,
    the processing unit controls traveling of the vehicle in such a way that at least one of a velocity, a velocity during a right turn and a left turn, acceleration during accelerating, deceleration during decelerating, and a change velocity of a steering angle of a handle is smaller than that in another driving mode.

5. The vehicle control apparatus according to any of supplementary notes 1 to 4, wherein
    the decision unit decides a safety driving mode as a driving mode of the vehicle when a person who satisfies the predetermined condition is detected, and,
    when the safety driving mode is decided during manual driving in which a driver of the vehicle controls traveling of the vehicle,
    the processing unit surveys whether it is satisfied that at least one of a velocity, a velocity during a right turn and a left turn, acceleration during accelerating, deceleration during decelerating, and a change velocity of a steering angle of a handle is equal to or less than a threshold value, and gives a warning to a driver of the vehicle when it is not satisfied.

6. The vehicle control apparatus according to any of supplementary notes 1 to 5, wherein
    the decision unit decides a safety driving mode as a driving mode of the vehicle when a person who satisfies the predetermined condition is detected, and,
    when the safety driving mode is decided during automatic driving in which a system of the vehicle controls traveling of the vehicle,
    the notification unit notifies an outside of the vehicle of the decided driving mode in response to the decision, and,
    when the safety driving mode is decided during manual driving in which a driver of the vehicle controls traveling of the vehicle,
    the notification unit notifies an outside of the vehicle of the decided driving mode in response to detection that at least one measurement value of a velocity, a velocity during a right turn and a left turn, acceleration during accelerating, deceleration during decelerating, and a change velocity of a steering angle of a handle satisfies a notification condition, after the decision.

7. The vehicle control apparatus according to any of supplementary notes 1 to 6, wherein
    the notification unit notifies an outside of the vehicle of the decided driving mode by using at least one means of vehicle-to-vehicle communication, road-to-vehicle communication, and display on a display provided outside the vehicle.

8. The vehicle control apparatus according to any of supplementary notes 1 to 7, wherein
    the decision unit further decides a driving mode of the vehicle, based on a number of detected persons who satisfy the predetermined condition.

9. A vehicle control method including, by a computer:
    acquiring internal situation information indicating a situation inside a vehicle;
    detecting a person who satisfies a predetermined condition inside the vehicle, based on the internal situation information;
    deciding a driving mode of the vehicle, based on whether the person is detected;
    performing processing of the decided driving mode; and
    notifying an outside of the vehicle of the decided driving mode.

10. A program causing a computer to function as:
    an acquisition unit that acquires internal situation information indicating a situation inside a vehicle;
    a detection unit that detects a person who satisfies a predetermined condition inside the vehicle, based on the internal situation information;
    a decision unit that decides a driving mode of the vehicle, based on whether the person is detected;
    a processing unit that performs processing of the decided driving mode; and
    a notification unit that notifies an outside of the vehicle of the decided driving mode.

REFERENCE SIGNS LIST

10 Vehicle control apparatus
11 Acquisition unit
12 Detection unit
13 Decision unit
14 Processing unit
15 Notification unit
1A Processor
2A Memory
3A Input/output I/F
4A Peripheral circuit
5A Bus

What is claimed is:

1. A vehicle control apparatus comprising:
at least one memory configured to store one or more instructions; and
at least one processor configured to execute the one or more instructions to:
acquire internal situation information indicating a situation inside a vehicle;
based on the internal situation information, detect a person inside the vehicle who satisfies a predetermined condition;
decide a driving mode of the vehicle based on whether the person is detected;
perform processing of the decided driving mode; and
notify an outside of the vehicle of the decided driving mode,
wherein the processor is further configured to execute the one or more instructions to:
in a case that the person who satisfies the predetermined condition is detected, decide a safety driving mode as a driving mode of the vehicle, and
in a case that the safety driving mode is decided during manual driving operated by a driver of the vehicle, notify an outside of the vehicle of the decided driving mode upon detecting that at least one measurement value of a velocity, a velocity during a right turn and a left turn, acceleration, deceleration, and a change velocity of a steering angle satisfies a notification condition.

2. The vehicle control apparatus according to claim 1, wherein
the processor is further configured to execute the one or more instructions to notify a passenger of the vehicle of the decided driving mode.

3. The vehicle control apparatus according to claim 1, wherein
the predetermined condition is a condition based on at least one of presence or absence of riding in a standing state, presence or absence of holding of a strap or a handrail, presence or absence of use of a wheelchair, and an estimated age.

4. The vehicle control apparatus according to claim 1, wherein the processor is further configured to execute the one or more instructions to
in a case that the person who satisfies the predetermined condition is detected, decide a safety driving mode as a driving mode of the vehicle, and
in a case that the safety driving mode is decided during automatic driving operated by a system of the vehicle, control at least one of a velocity, a velocity during a right turn and a left turn,-acceleration, deceleration, and a change velocity of a steering angle of the vehicle to be smaller than that in a driving mode other than the safety driving mode.

5. The vehicle control apparatus according to claim 1, wherein the processor is further configured to execute the one or more instructions to
in a case that the person who satisfies the predetermined condition is detected, decide a safety driving mode as a driving mode of the vehicle, and
in a case that the safety driving mode is decided during manual driving operated by a driver of the vehicle, monitor whether it is satisfied that at least one of a velocity, a velocity during a right turn and a left turn, acceleration, deceleration, and a change velocity of a steering angle of a handle is equal to or less than a threshold value, and notify the driver of the vehicle of a warning in a case that it is not satisfied.

6. The vehicle control apparatus according to claim 1, wherein the processor is further configured to execute the one or more instructions to;
in a case that the safety driving mode is decided during automatic driving operated by a system of the vehicle, notify an outside of the vehicle of the decided driving mode.

7. The vehicle control apparatus according to claim 1, wherein
the processor is further configured to execute the one or more instructions to notify an outside of the vehicle of the decided driving mode by at least one of vehicle-to-vehicle communication, road-to-vehicle communication, and displaying on a display-located outside of the vehicle.

8. The vehicle control apparatus according to claim 1, wherein
the processor is further configured to execute the one or more instructions to decide a driving mode of the vehicle based on a number of detected persons who satisfy the predetermined condition.

9. A vehicle control method comprising, by a computer:
acquiring internal situation information indicating a situation inside a vehicle;
based on the internal situation information, detecting a person inside the vehicle who satisfies a predetermined condition;
deciding a driving mode of the vehicle based on whether the person is detected;
performing processing of the decided driving mode; and
notifying an outside of the vehicle of the decided driving mode
wherein the vehicle control method further comprises:
in a case that the person who satisfies the predetermined condition is detected, deciding a safety driving mode as a driving mode of the vehicle, and
in a case that the safety driving mode is decided during manual driving operated by a driver of the vehicle, notifying an outside of the vehicle of the decided driving mode upon detecting that at least one measurement value of a velocity, a velocity during a right turn and a left turn, acceleration, deceleration, and a change velocity of a steering angle satisfies a notification condition.

10. A non-transitory storage medium storing a program causing a computer to:
acquire internal situation information indicating a situation inside a vehicle;
based on the internal situation information, detect a person inside the vehicle who satisfies a predetermined condition;
decide a driving mode of the vehicle based on whether the person is detected;
perform processing of the decided driving mode; and
notify an outside of the vehicle of the decided driving mode
wherein the program further causing the computer to:
in a case that the person who satisfies the predetermined condition is detected, decide a safety driving mode as a driving mode of the vehicle, and
in a case that the safety driving mode is decided during manual driving operated by a driver of the vehicle, notify an outside of the vehicle of the decided driving mode upon detecting that at least one measurement value of a velocity, a velocity during a right turn and a left turn, acceleration, deceleration, and a change velocity of a steering angle satisfies a notification condition.

\* \* \* \* \*